United States Patent
Kandaswamy et al.

(10) Patent No.: US 9,148,367 B2
(45) Date of Patent: Sep. 29, 2015

(54) SYSTEM AND METHOD FOR BINDING FLOWS IN A SERVICE CLUSTER DEPLOYMENT IN A NETWORK ENVIRONMENT

(71) Applicant: CISCO TECHNOLOGY, INC., San Jose, CA (US)

(72) Inventors: Sridar Kandaswamy, San Jose, CA (US); Rajasekhar Manam, San Jose, CA (US); Ramesh V. N. Ponnapalli, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 147 days.

(21) Appl. No.: 13/633,716

(22) Filed: Oct. 2, 2012

(65) Prior Publication Data
US 2014/0092906 A1    Apr. 3, 2014

(51) Int. Cl.
*H04L 12/721* (2013.01)
*H04L 29/06* (2006.01)

(52) U.S. Cl.
CPC ............... *H04L 45/38* (2013.01); *H04L 69/22* (2013.01)

(58) Field of Classification Search
None
See application file for complete search history.

(56) References Cited

U.S. PATENT DOCUMENTS

| | | | |
|---|---|---|---|
| 6,266,335 B1 * | 7/2001 | Bhaskaran | 370/399 |
| 6,633,565 B1 * | 10/2003 | Bronstein et al. | 370/392 |
| 6,650,641 B1 * | 11/2003 | Albert et al. | 370/392 |
| 6,687,222 B1 * | 2/2004 | Albert et al. | 370/230 |
| 6,704,278 B1 * | 3/2004 | Albert et al. | 370/216 |
| 6,735,169 B1 * | 5/2004 | Albert et al. | 370/229 |
| 6,742,045 B1 * | 5/2004 | Albert et al. | 709/238 |
| 6,775,692 B1 * | 8/2004 | Albert et al. | 709/207 |
| 6,836,462 B1 * | 12/2004 | Albert et al. | 370/235 |
| 6,856,991 B1 * | 2/2005 | Srivastava | 707/10 |
| 7,047,315 B1 * | 5/2006 | Srivastava | 709/238 |
| 7,051,066 B1 * | 5/2006 | Albert et al. | 709/202 |
| 7,088,718 B1 * | 8/2006 | Srivastava | 370/392 |
| 7,382,725 B1 * | 6/2008 | Kakadia | 370/230 |
| 8,055,735 B2 | 11/2011 | Krishnappa et al. | |
| 8,170,022 B2 | 5/2012 | Tychon et al. | |
| 2003/0053448 A1 * | 3/2003 | Craig et al. | 370/353 |
| 2003/0105865 A1 * | 6/2003 | McCanne et al. | 709/225 |
| 2005/0080885 A1 * | 4/2005 | Ahmed et al. | 709/223 |
| 2005/0249199 A1 * | 11/2005 | Albert et al. | 370/352 |
| 2007/0237147 A1 * | 10/2007 | Quinn et al. | 370/392 |
| 2008/0177896 A1 * | 7/2008 | Quinn et al. | 709/238 |
| 2008/0298230 A1 * | 12/2008 | Luft et al. | 370/219 |
| 2009/0037713 A1 * | 2/2009 | Khalid et al. | 713/1 |
| 2009/0147788 A1 * | 6/2009 | Lee et al. | 370/392 |
| 2010/0063988 A1 * | 3/2010 | Khalid et al. | 709/202 |
| 2010/0080226 A1 * | 4/2010 | Khalid et al. | 370/392 |
| 2010/0165985 A1 * | 7/2010 | Sharma et al. | 370/389 |
| 2010/0254385 A1 * | 10/2010 | Sharma et al. | 370/392 |
| 2010/0271964 A1 * | 10/2010 | Akhter et al. | 370/252 |

(Continued)

*Primary Examiner* — Ayaz Sheikh
*Assistant Examiner* — Peter Chau
(74) *Attorney, Agent, or Firm* — Patent Capital Group

(57) ABSTRACT

A method is provided in one example and includes receiving a first packet of a connection between a client and a server. The first packet is tagged with a tag comprising a member id of a service node in a service cluster that includes a plurality of nodes having distinct member ids. The method can also include mapping the member id to the service node in a tag-to-node map; receiving a second packet of the connection, where the second packet is tagged with the tag comprising the member id; determining the service node from the tag-to-node map; and forwarding the second packet to the service node.

20 Claims, 6 Drawing Sheets

(56) References Cited

U.S. PATENT DOCUMENTS

| | | | |
|---|---|---|---|
| 2011/0023090 A1* | 1/2011 | Asati et al. | 726/4 |
| 2011/0026513 A1* | 2/2011 | Tien | 370/350 |
| 2011/0314155 A1 | 12/2011 | Narayanaswamy et al. | |
| 2012/0307826 A1* | 12/2012 | Matsuoka | 370/390 |

* cited by examiner

SYSTEM AND METHOD FOR BINDING FLOWS IN A SERVICE CLUSTER DEPLOYMENT IN A NETWORK ENVIRONMENT

TECHNICAL FIELD

This disclosure relates in general to the field of communications and, more particularly, to a system and a method for binding flows in a service cluster deployment in a network environment.

BACKGROUND

Cloud computing provides flexibility and scalability to an Information Technology (IT) organization, enabling the organization to provision new services quickly and cost effectively by addressing IT requirements and policies, meeting demands of high utilization, and dynamically responding to change, in addition to providing security and high performance. Such cloud computing environments are typically multi-tenancy multi-user environments, with users accessing common folders and files. Multi-tenancy multi-user environments may increase operational efficiency through cost-effective use of expensive infrastructure, driving up economies of scale through shared resourcing, and rapid, agile deployment of customer applications. In such and similar infrastructure, network service offerings may have to keep up with the dramatic increase in scale of network bandwidth.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example and includes receiving a first packet of a connection between a client and a server. The first packet is tagged with a tag comprising a member id of a service node in a service cluster that includes a plurality of nodes having distinct member ids. The method can also include mapping the member id to the service node in a tag-to-node map; receiving a second packet of the connection, where the second packet is tagged with the tag comprising the member id; determining the service node from the tag-to-node map; and forwarding the second packet to the service node.

In more specific embodiments, the method can also include receiving the untagged first packet from the client, choosing (e.g., through Equal Cost Multi-Path routing algorithms) the service node from the service cluster, and forwarding the first packet to the service node. The service node may generate the member id, insert the member id into the tag, and tag the first packet, receive the second packet tagged with the member id, and strip the tag from the second packet before forwarding the second packet to the client. The method can further include mapping the tag to the flow, stripping the tag from the first packet, receiving the second packet belonging to the flow, determining the tag from the tag-to-flow map, and tagging the second packet with the member id and other features.

Example Embodiments

Figure 1:
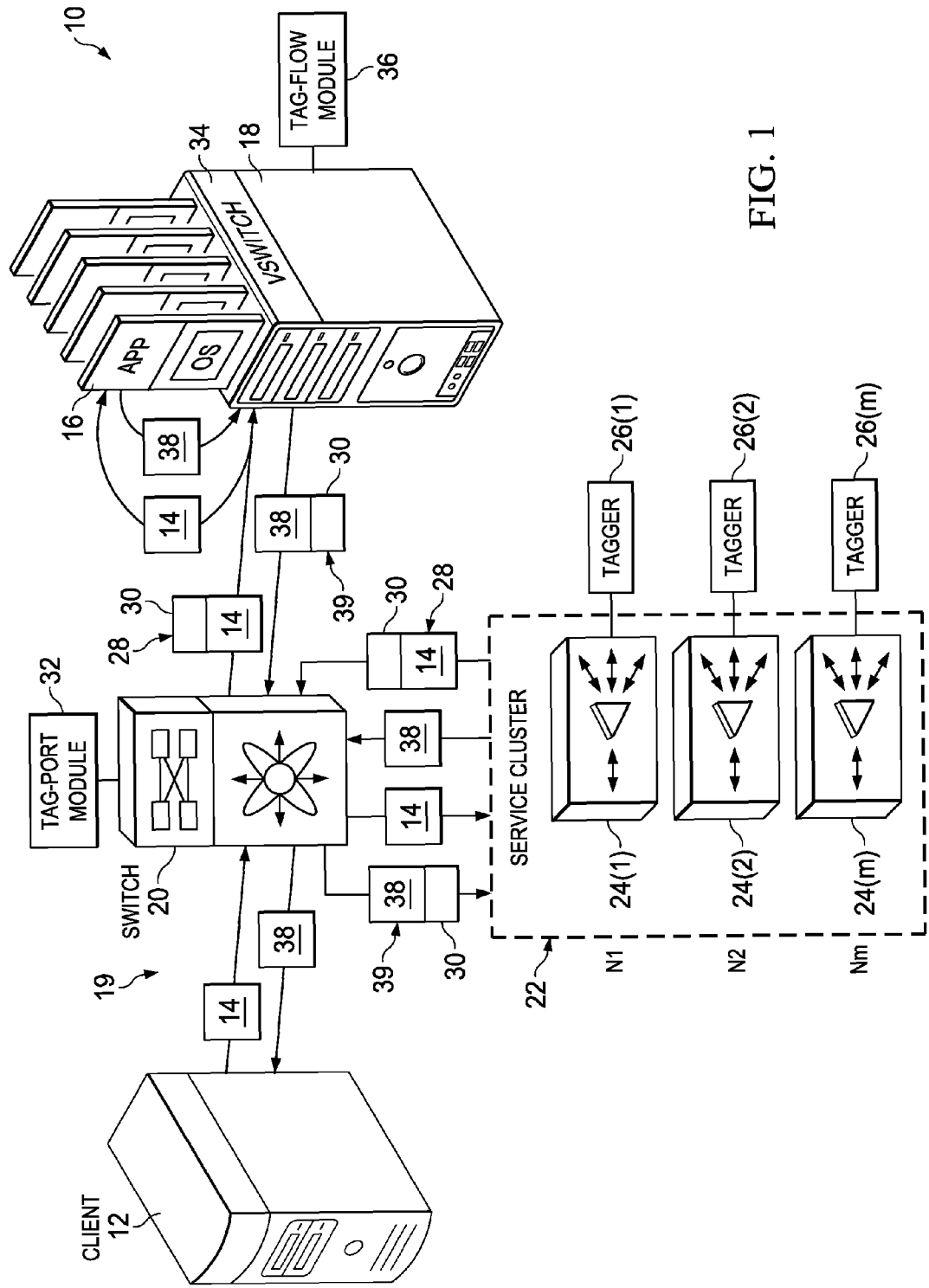
FIG. 1 is a simplified block diagram illustrating a communication system for binding flows in a service cluster deployment in a network environment according to an example embodiment.

Turning to FIG. 1, FIG. 1 is a simplified block diagram illustrating a communication system 10 for binding flows in a service cluster deployment in a network environment in accordance with one example embodiment. Communication system 10 includes a client 12 that may send a request packet 14 to an application 16 on a server 18 over a network 19. Request packet 14 may be forwarded by one or more switches (represented by switch 20) to a service cluster 22 for processing. Service cluster 22 may include one or more service nodes 24(1), 24(2) ... 24(m), each of which can include respective taggers 26(1), 26(2) ... 26(m). As used herein, the term "service node" encompasses any network element that can provide one or more network services, such as load balancing, security, wide area network (WAN) optimization, Domain Name System (DNS) services, Dynamic Host Configuration Protocol (DHCP) services, Internet Protocol (IP) Address Management (IPAM), Remote Authentication Dial In User Service (RADIUS) services, Trivial File Transfer Protocol (TFTP) services, Network Time Protocol (NTP) services, and Domain Name System Security Extensions (DNSSEC) deployment and management. The term "network element" is meant to encompass any type of computers, network appliances, servers, routers, switches, gateways, bridges, load balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

At least one of service nodes 24(1)-24(m) and corresponding one of taggers 26(1)-26(m) may process request packet 14, including tagging request packet 14 to generate tagged request packet 28. As used herein, "tagging" is meant to encompass any type of marking, inserting, attaching, and/or adding information to packets (e.g., packet 14). In various embodiments, request packet 14 may be tagged with a tag 30. Tag 30 may include a unique "member id" (e.g., a name, a symbol, a number, or any combination thereof) that serves to identify the particular service node (e.g., service node 24(1)) that services packet 14. Each service node 24(1)-24(m) in service cluster 22 may have a different member id.

Tagged request packet 28 may be forwarded to switch 20, where a tag-port module 32 may map tag 30 to the service node (e.g., service node 24(1)) that processed request packet 14. As used herein, the term "mapping" can include associating (e.g., with a rule of correspondence) an object (e.g., tag 30) with another object (e.g., service node 24(1)). The term mapping can also include charting, connecting, relating, linking, or correlating an object with another object. In some embodiments, switch 20 may map tag 30 to a port (e.g., a physical or virtual communication channel) or other location parameter (e.g., that can identify an address or location) corresponding to service node 24(1). In some embodiments, switch 20 may assign a separate port for each of service nodes 24(1)-24(m). In other embodiments, switch 20 may assign a same (or common) port with distinct location parameters for some or all of service nodes 24(1)-24(m). Switch 20 may forward tagged request packet 28 to server 18. Server 18 may include a vSwitch 34 that can include a tag-flow module 36 to map tag 30 to the flow (e.g., through a tag-to-flow map), strip tag 30 from tagged request packet 28, and forward request packet 14 (untagged) to application 16.

Application 16 may respond with a response packet 38 belonging to the same connection as packet 14. As used herein, the term "connection" can include a set of packets communicated between a pair of network elements (e.g., client 12 and server 18). Packets belonging to a connection move from client 12 to server 18 and from server 18 to client 12 through switch 20. A single connection can include at least two flows (e.g., transfer of a sequence of related packets over a connection between a source (e.g., client 12) and a destination (e.g., server 18) through a switch (e.g., switch 20)): a request flow, comprising at least one request packet (e.g., request packet 14) and a corresponding response flow, comprising at least one response packet (e.g., response packet 38). For example, request packet 14 can be a SYN packet from client 12 to server 18, and response packet 38 can be a SYN/ACK packet from server 18 to client 12 in a transmission control protocol (TCP) connection. Tag-flow module 36 in vSwitch 34 may perform a flow lookup and repopulate tag 30 on packet 38 as it egresses the server interface. Tagged response packet 39 may include response packet 38 tagged with tag 30 that can include the member id of the service node (e.g., service node 24(1)) that processed related request packet 14.

Switch 20 may use tag 30 to make appropriate forwarding decisions. For example, switch 20 may inspect tag 30 in tagged response packet 39 and forward tagged response packet 39 to the service node (e.g., service node 24(1)) that previously processed request packet 14 belonging to the same connection. Service node 24(1) may strip tag 30 from tagged response packet 39, and forward response packet 38 (untagged) to client 12 over switch 20. In various embodiments, switch 20 may preferentially use the tag over other forwarding mechanisms to determine the packet destination. Thus, embodiments of communication system 10 may facilitate processing return packet 38 by the same service node (e.g., service node 24(1)) that processed request packet 14 in a manner transparent to client 12 and application 16.

For purposes of illustrating the techniques of communication system 10, it is important to understand the communications in a given system such as the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

A typical Layer 5 flow may begin with a client request for content from a server. The client may initiate the request, for example, through a URL in a browser. After a D-proxy resolves the DNS request and points the client to the service node, the service node establishes a front-end TCP connection with the client using a TCP 3-way handshake. When it establishes a Layer 5 flow, the service node connected to the switch (and in some cases, integral with the switch) may spoof the back-end TCP connection by acting as a proxy for the destination server. The service node may gather the information it needs to select the best server to process the content request. In one example, the service node may examine the HTTP header and URL in the HTTP request. Based on the information in the HTTP header, the URL, and the content rules configured on the service node, the service node may select the best server to satisfy the request. After the service node selects the server to provide the requested content to the client, the service node establishes the back-end connection with the server using the TCP 3-way handshake and splices the front-end and back-end connections together. The service node (through the switch) forwards the content request from the client to the server. The server responds to the client through the switch and service node. For the remaining life of the flow, the switch and service node switch the packets between the client and the server, and perform network address translation (NAT) and other packet transformations as required.

In a large cloud infrastructure, the number of flows traversing the network at any given instant can be voluminous. Network service offerings through appropriate service nodes have to keep up with increasing scale of network bandwidth. Services like load balancing, security and WAN optimization can be implemented on intelligent service nodes, which may track flows and their respective states and compute intensive operations to characterize or analyze flows. Data center consolidation and cloud deployments can require dynamic scaling of services. In such scenarios, bandwidth and performance scaling should have no or minimal disruption. For example, flow table size should scale based on user demand. However, due to inherent hardware limitations, the switch cannot have flow tables that are too large. Moreover, it is generally not feasible to build a single service node that can provide fat links, and huge compute and processing power to process all flows in the cloud.

A clustering approach can improve scaling by adding more service nodes to the clustered pool rather than replacing an existing service node with an increased capacity device. Such a clustering approach can protect existing capital investments, in particular, where capacity of individual service nodes cannot be increased beyond a threshold in a cost effective manner. Clustering enables smaller capacity service nodes to be "strung together" to work in unison as a single instance. Such clusters can enable scaling bandwidth up to (and greater than) 160 Gbps.

In particular, when multiple service nodes are working together in unison, flow state should be maintained across all the individual service nodes in the cluster. A typical service node's connection contains a client-request and a server response. However, five tuple flow information (e.g., source internet protocol (IP) address, destination IP address, protocol, source port, and destination port) of a connection is not same in the request and response flows. Nevertheless, both sides of the connection should be processed on the same service node to maintain and populate the state information, among other reasons. For example, chatter between service nodes in the cluster can be minimized if forward and reverse flows are seen by the same service node in the cluster. On the other hand, if flows have to be punted to owners (e.g., senders or originators of the packets) then significant latency may be added on the end-to-end flow along with increasing demands on the network capacity and the computing resources of the entire system, leading to potentially dramatic decrease in the scaling capability of the clustered approach.

A common interconnection model for connecting a cluster of service nodes to an upstream switch is with a port channel. The port channel can provide a stateless spraying of the flows and is efficient as it scales well. The switch can distribute the incoming flows to service nodes. Distribution may be based on port channel hash algorithm configured on the switch, including L4 hash or L3 hash. However, port channel hash does not guarantee that the connection is processed by the same service node. Often, service nodes such as load balancers may perform a header rewrite of a packet, for example rewrite a Virtual IP address (VIP) with a real server IP address. On the return, the load balancer may translate the server IP address back to the VIP before sending towards the client. However, when the load balancer is part of a cluster, there is no guarantee that the same load balancer will see packets of the return flow. For example, the port channel hash of the switch may spray the return packet to a different service node in the service cluster, because of the transformed header parameters, resulting in a detrimental impact on the performance. Moreover, node addition or removal from the service cluster can affect port channel distribution algorithm.

Another approach may be to distribute flows to the different service nodes according to routing algorithms such as Equal Cost Multi-Path (ECMP) routing. The switch can distribute the incoming flows using ECMP. However, the request and response flows of a connection may go to different service nodes based on the hash used to select the destination service node. Although such an approach does not have any issues with adding or removing nodes from the cluster, the approach may require a mechanism to tie both request and response flows of a connection to the same service node of a service cluster.

Communication system 10 is configured to address these issues (and others) in offering a system and a method for binding flows in a service cluster deployment in a network environment. Embodiments of communication system 10 can maintain tags (e.g., including tag 30) at a flow level with a flow table being distributed across multiple network elements, enabling potential scaling. As used herein, the term "flow table" can include any suitable data structure, table, or other suitable object in software or hardware that includes information about how to process and forward a packet. According to various embodiments, related flows (e.g., flows belonging to a single connection) may be bound to the same tag (e.g., tag 30) and hence to the same service node (e.g., service node 24(1)) in service cluster 22. Tagged packets may not be visible to endpoints (e.g., client 12 or application 16). Endpoints may be abstracted out of network details to enable existing applications to run seamlessly without configuration changes to account for tags.

Any tagging mechanism such as virtual network tag (VN-Tag), service insertion architecture (SIA) label and others can be implemented within the broad scope of the embodiments. In a general sense, tags can carry additional information with each flow to pin all related flows of a connection to a service node (e.g., service node 24(1)) in service cluster 22. For example, SIA labels can require a tag to be carried across L2 and L3 boundaries, and the SIA header may be interpreted by network devices for redirection traffic towards services.

Embodiments of communication system 10 can achieve scale by incremental addition of capacity in the service cluster deployment. For example, service nodes may be incrementally added to the service cluster. Flow tables for tag-to-flow maps can be of the order the capacity of individual service nodes 24(1)-24(m) as opposed to total capacity of service cluster 22. In various embodiments, flow tables can be distributed across service nodes 24(1)-24(m) and one or more server 18. Service cluster 22 may be identified by a single network address (e.g., Internet Protocol (IP) address) although it includes multiple service nodes 24(1)-24(m). Stated in other terms, all service nodes 24(1)-24(m) may be identified by the same IP address in network 19. Service nodes 24(1)-24(m) may be substantially identical, for example, performing substantially identical service functions (e.g., load balancing, security, etc.) with identical configuration, so as to be indistinguishable to an external network element, such as switch 20. Each service node 24(1)-24(m) may handle a subset of the flows traversing service cluster 22.

In some embodiments, upon ingress, switch 20 may use ECMP routing algorithms to forward request packet 14 from client 12 to a specific service node (e.g., service node 24(1)) in service cluster 22. The forwarding decision may be based on the L3 and/or L4 parameters on request packet 14. For example, service node 24(1) may receive request packet 14 according to the ECMP algorithm with flow parameters including client IP address as source IP address and service cluster IP address as destination IP address. Service node 24(1) may process packet 14 appropriately, and can potentially rewrite any of the packet headers (e.g., network address translator (NAT), port address translation (PAT)). For example, in an application delivery controller (ADC) deployment, the VIP may be rewritten to a real server IP address.

The associated tag including tag 30 may be inserted into request packet 14. Tagged request packet 28 may be subsequently forwarded by switch 20 to server 18 having the real server IP address. The tag may be preserved, but not used, in the forwarding decision by switch 20. vSwitch 34 may strip tag 30 from tagged request packet 28 and populate a flow-to-tag map in vSwitch 34, server 18 or supported infrastructure. Request packet 14, which now looks like a standard IP packet, may be sent to application 16.

Application 16 may egress response packet 38. A flow lookup may be performed at vSwitch 34, and the flow entry corresponding to the flow may indicate tag 30 associated with the connection. Response packet 38 may be tagged with tag 30 and sent out towards downstream switch 20 as tagged response packet 39. Switch 20 may use tag 30 in its forwarding decision. For example, tag 30 may indicate service node 24(1) that processed related request packet 14 in the ingress path. Switch 20 may forward tagged response packet 39 to service node 24(1). Thus, reverse path flows may be processed by the same service node (e.g., service node 24(1)) that processed the forward path flows without any punting.

Embodiments of communication system 10 can enable all related flows (typically request and response) of a single connection to be processed by the same service node (e.g., service node 24(1)) in a clustered service environment without maintaining any flow state on ingress switch 20. According to various embodiments, flow state may be distributed across service nodes 24(1)-24(m) and across the endpoints (e.g., server 18, vSwitch 34), thereby scaling incrementally with load and yet completely transparent to end applications.

By binding the flows of a connection to a single service node (e.g., service node 24(1)) in service cluster 22, various advantages may be realized. For example, flow state sharing or packet punting may not be needed across service nodes 24(1)-24(m) of service cluster 22. Embodiments of communication system 10 can facilitate potentially dramatic increase in performance. Incremental performance increase may also be achieved with addition of each service node to service cluster 22. Any insertions can be detected by spanning the traffic to a network capture port for analysis.

Turning to the infrastructure of communication system 10, the network topology can include any number of users, hosts, storage, servers, routers, gateways, and other nodes interconnected to form a large and complex network. A node may be any electronic device, user, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs. Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable service nodes (physical or virtual) may be used to facilitate electronic communication between various service nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that the communication system 10 shown in FIG. 1 is simplified for ease of illustration.

The example network environment may be configured over a physical infrastructure that may include one or more networks and, further, may be configured in any form including, but not limited to, local area networks (LANs), wireless local area networks (WLANs), virtual local area networks (VLANs), metropolitan area networks (MANs), wide area networks (WANs), virtual private networks (VPNs), Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

Embodiments of communication system 10 can include server 18 hosting application 16 (and other applications). In some embodiments, server 18 may implement a hypervisor based managed environment running application 16 as a virtual machine. In various embodiments, endpoints (e.g., application 16) may be part of a virtualized network environment. The virtualized network environment can include appropriate software or hardware (e.g., intelligent network adapters) to maintain flow-to-tag binding, strip tag 30 from tagged request packet 28, and deliver untagged request packet 14 to application 16, among other operations. In addition, the virtualized network environment may be configured to look up a local flow table (e.g., in vSwitch 34) and re-tag response packet 38 with tag 30. According to various embodiments flow-to-tag bindings may be maintained merely for the set of flows seen by the particular endpoint (e.g., application 16).

vSwitch 34 can encompass a physical or virtual switch configured with appropriate software and hardware to perform the operations described herein. The term "vSwitch" as used herein does not imply any association with any specific commercial product. In some embodiments, vSwitch 34 may be part of a virtual network environment, configured with appropriate L2 forwarding engine, VLAN tagging, stripping, and filtering units, L2 security and other functional features, in addition to tag-flow module 36. In such embodiments, vSwitch 34 may be implemented on server 18 and can function similar to a physical Ethernet switch. In other embodiments, vSwitch 34 may be an Ethernet switch connected to server 18.

In various embodiments, client 12 can be a software application, for example, embedded in the operating system or hardware of a computer, mobile device, or other network element. Client 12 can also encompass any type of electronic devices such as computers, laptops, smartphones, or other object capable of sending, receiving, or forwarding information over communications channels in a network. Switch 20 can include one or more physical or virtual switches, routers, and other network elements configured with appropriate software and hardware to forward packets in a network.

Service nodes 24(1)-24(m) may be configured to provide various network services in addition to the operations described herein. In some embodiments, service nodes 24(1)-24(m) may be physical service appliances, and in other embodiments, they may be virtual. The associated hardware may include various Ethernet ports, serial connectors, VGA connectors, USB connectors, removable media devices, power supplies, cooling equipment, storage devices, processors, memory elements, etc. Service nodes 24(1)-24(m) may be physically collocated at a single location (e.g., on a single rack system), or they may be located at different physical locations, and logically connected to the same service cluster 22 through appropriate configuration settings. Deployed applications, operating systems, and associated functionalities may be substantially identical on service nodes 24(1)-24(m), so that any one service node may be functionally indistinguishable from any other service node in service cluster 22.

Taggers 26(1)-26(m), tag-port module 32, and tag-flow module 36 may include applications configured to perform the operations described herein. Taggers 26(1)-26(m), tag-port module 32, and tag-flow module 36 may be stand-alone applications, or firmware embedded in corresponding service nodes 24(1)-24(m), switch 20, and vSwitch 34, respectively. Taggers 26(1)-26(m), tag-port module 32, and tag-flow module 36 may also be implemented in hardware (e.g., Application Specific Integrated Circuits (ASIC)). An "application" as used herein, can be inclusive of an executable file comprising instructions that can be understood and processed on a computer, and may further include library modules loaded during execution, object files, system files, hardware logic, software logic, or any other executable modules.

Note that, merely for ease of illustration, switch 20 is illustrated in FIG. 1 as a single device forwarding request packet 14, tagged request packet 28, response packet 38 and tagged response packet 39. In various embodiments, switch 20 may be a single device, or a plurality of devices that maintain the tag-to-node map associating tag 30 and corresponding service node (e.g., service node 24(1)). In various embodiments, forwarding decision for each incoming packet may be made by a separate physical or virtual switch, characterized herein as switch 20, for ease of illustration.

In various embodiments, switch 20 can include one or more switches or routers and other network elements that can interconnect one or more nodes within a network (e.g., network 19). For example, in some embodiments, switch 20 may be directly connected to service cluster 22 and amenable to Layer 2 forwarding. In other embodiments, additional switches (or routers) may connect service cluster 22 with client 12 and/or server 18, and packets may be forwarded in Layer 3. Any number of switches may be included in network 19 within the broad scope of the embodiments. In general, switch 20 can include appropriate hardware and software to enable it to inspect packets, determine the source and destination device of the packets, and forward them appropriately.

Embodiments of communication system 10 can enable dynamic scaling, for example, by distributing the flow table across service nodes 24(1)-24(m) and server 18. In various embodiment, the flow table can include at least the tag-to-node map and the tag-to-flow map. In addition, embodiments of communication system can facilitate incremental scaling. For example, one or more service nodes may be added to service cluster 22, without departing from the scope of the operations described in various embodiments herein.

Figure 2:
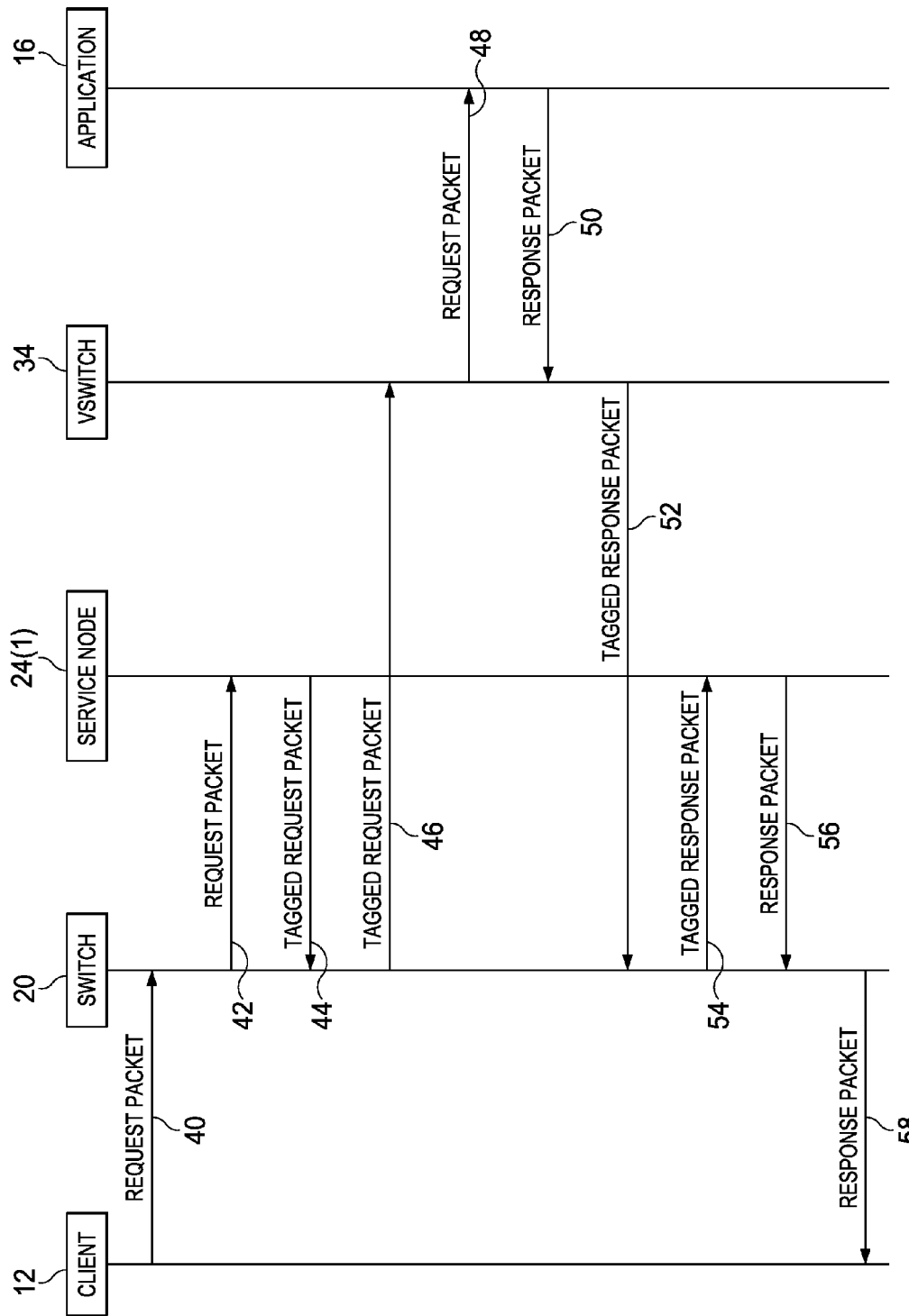
FIG. 2 is a simplified sequence diagram illustrating example activities that may be associated with an embodiment of the communication system.

Turning to FIG. 2, FIG. 2 is a simplified sequence diagram illustrating example activities that may be associated with an embodiment of communication system 10. At 40, request packet 14 may be sent from client 12 to switch 20. Request packet 14 may be part of a connection between client 12 and server 18 (or application 16). Switch 20 may determine an appropriate service node (e.g., service node 24(1)) from service cluster 22 through ECMP routing algorithms to process request packet 14. At 42, request packet 14 may be forwarded to selected service node 24(1). Service node 24(1) may generate a member id for service node 24(1), insert the member id into tag 30, tag request packet 14 with tag 30, and perform other processing (e.g., load balancing, security, etc.) as appropriate. At 44, tagged request packet 28 (i.e., request packet 14 tagged with tag 30) may be sent to switch 20. Note that other tags (VNTag, SIA label, etc.) may also be added to request packet 14 as appropriate. Switch 20 may inspect tag 30, and map tag 30 to service node 24(1) (e.g., using a corresponding port) in a tag-to-node map.

At 46, tagged request packet 28 may be forwarded to application 16, and intercepted by vSwitch 34. vSwitch 34 may inspect tag 30, map tag 30 to the flow in a tag-to-flow map, and strip tag 30 from tagged request packet 28. At 48, request packet 14 (untagged) may be forwarded to application 16. At 50, application 16 may respond with response packet 38.

vSwitch 34 may inspect response packet 38, determine that it belongs to the same connection as request packet 14 (e.g., by inspecting packet headers and other suitable information), and tag response packet 38 with tag 30 to generate tagged response packet 39. At 52, tagged response packet 39 may be sent to switch 20.

Switch 20 may inspect tag 30 in tagged response packet 39, and determine (e.g., from the previously stored tag-to-node map) that service node 24(1) had previously processed packets pertaining to the same connection. At 54, switch 20 may forward tagged response packet 39 to service node 24(1). Service node 24(1) may strip tag 30 from tagged response packet 39, perform other processing as appropriate (e.g., rewrite header), and forward response packet 38 (untagged) to switch 20 at 56. At 58, switch 20 may forward response packet 38 to client 12.

Figure 3:
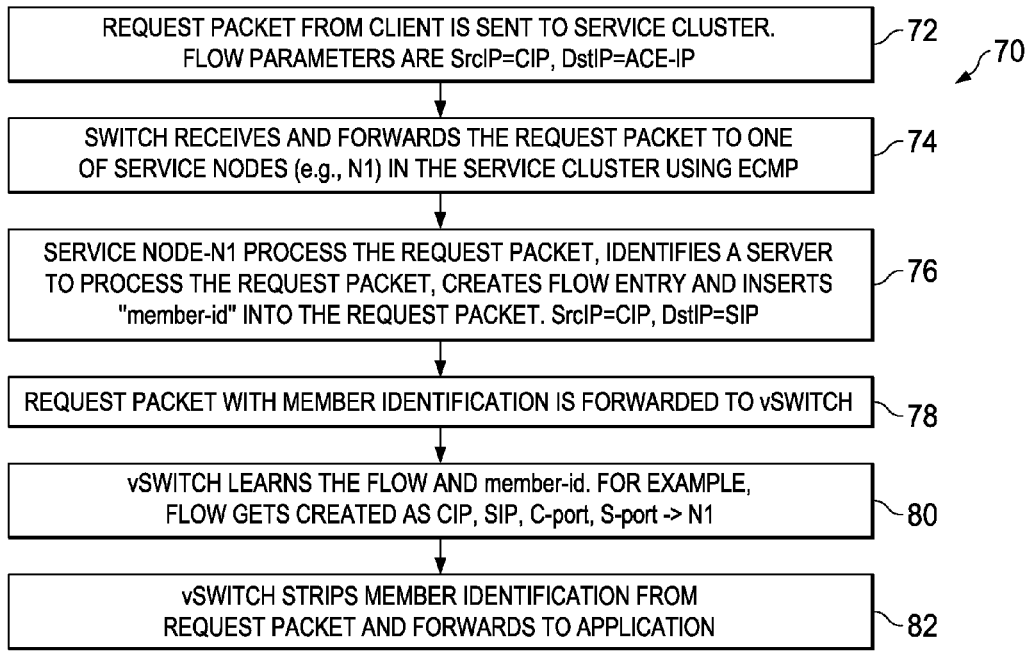
FIG. 3 is a simplified flow diagram illustrating example operations that may be associated with embodiments of the communication system.

Turning to FIG. 3, FIG. 3 is a simplified flow diagram illustrating example operations that may be associated with embodiments of the communication system 10. Operations 70 can include 72, at which request packet 14 is sent from client 12 to service cluster 22. Flow parameters may include client IP address (CIP) as the source IP address (SrcIP), and service cluster IP address (ACE-IP) as the destination IP address (DstIP). At 74, switch 20 may receive request packet 14 and forward request packet 14 to one of service nodes 24(1)-24(m) (e.g., service node 24(1), denoted as N1 in the FIGURE) in service cluster 22, for example, using ECMP routing algorithms.

At 76, service node 24(1) (i.e., N1) processes request packet 14, identifies server 18 to process request packet 18, creates a flow entry (e.g., defined by 5-tuple <source IP address, destination IP address, protocol, source port, destination port>), and inserts tag 30 (e.g., member ID) into request packet 14 to generate tagged request packet 28. At 78, tagged request packet 28 (tagged with tag 30) is forwarded to vSwitch 34. At 80, vSwitch 34 learns the flow and member ID from packet headers and tag 30, respectively. For example, flow gets created as CIP, SIP, C-port and S-port, corresponding to the 5 tuple information, and associated with N1 in a tag-to-flow map. At 82, vSwitch 34 may strip tag 30 (e.g., member ID) from tagged request packet 28 and forward the request packet 14 (untagged) to application 16.

Figure 4:
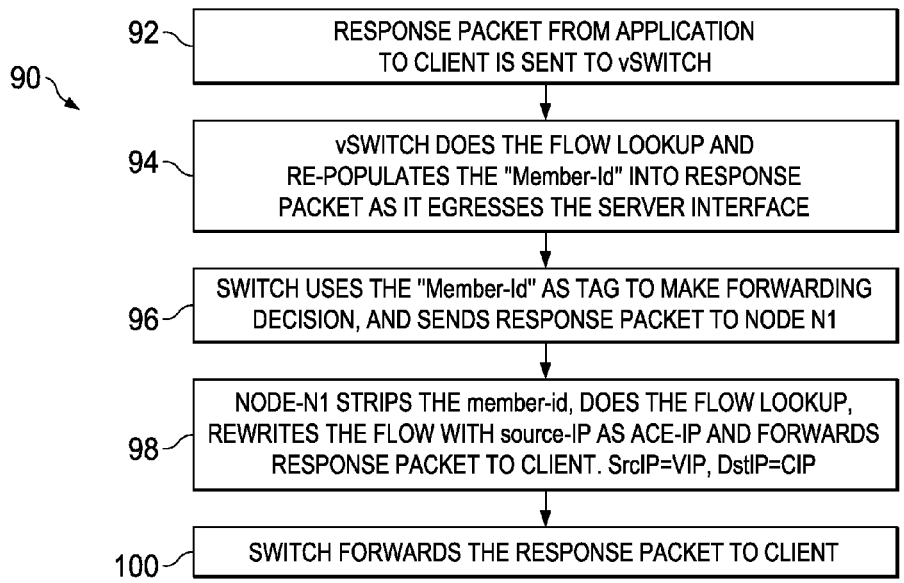
FIG. 4 is a simplified flow diagram illustrating other example operations that may be associated with embodiments of the communication system.

Turning to FIG. 4, FIG. 4 is a simplified flow diagram illustrating other example operations that may be associated with embodiments of communication system 10. Operations 90 include 92, at which response packet 38 from application 16 to client 12 is sent through vSwitch 34. At 94, vSwitch 24 may do a flow lookup and re-populate tag 30 into response packet 38 as it egresses the server interface. At 96, switch 20 may use tag 30 to make its forwarding decision, and send tagged response packet 39 to service node 24(1) (i.e., N1). At 98, service node 24(1) may strip tag 30 from tagged response packet 39, do a flow lookup, rewrite the flow with source IP address and forward response packet 38 (untagged) to client 12. For example, source IP may be a virtual IP address (VIP), and destination IP address may be CIP.

Figure 5:
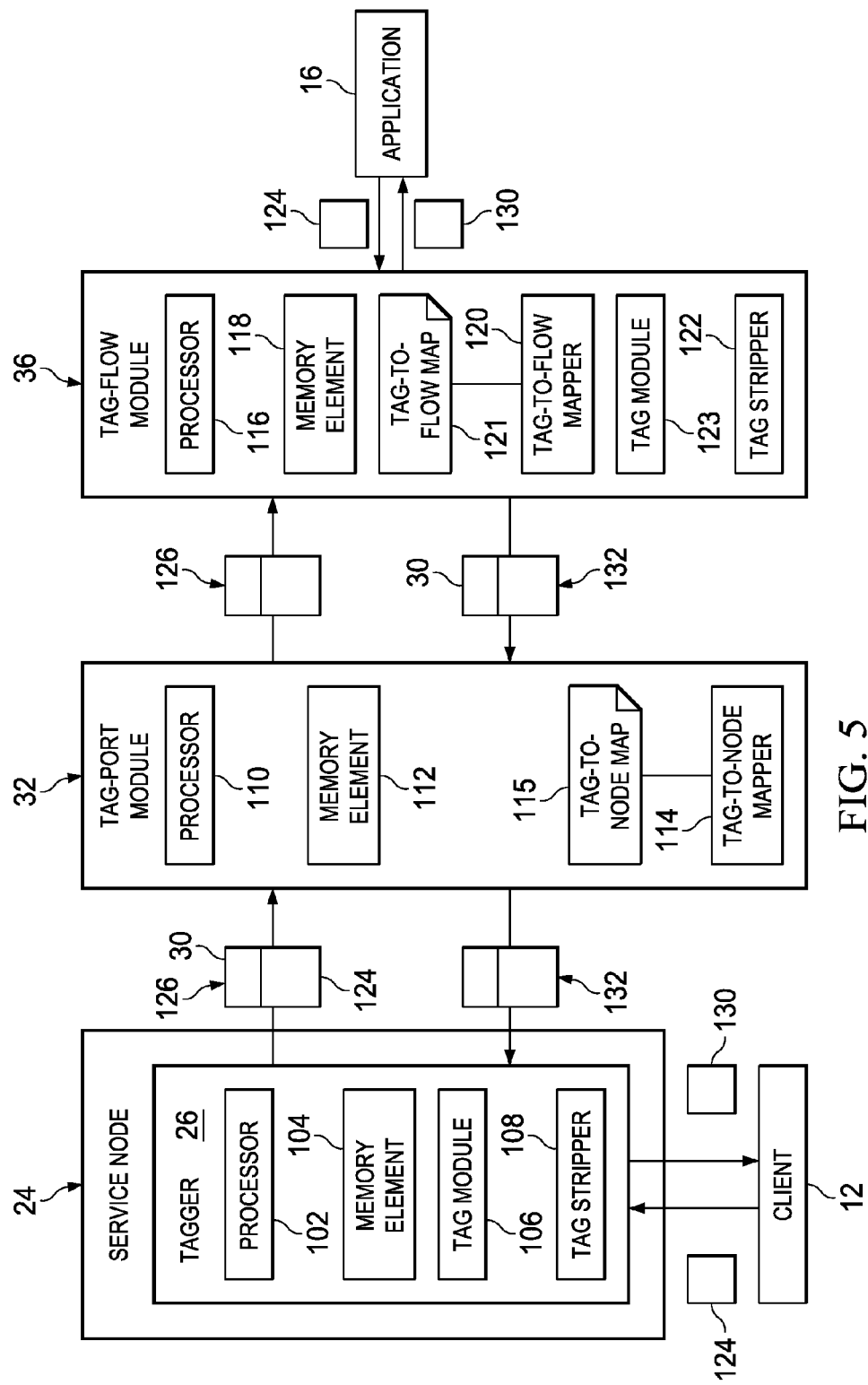
FIG. 5 is a simplified block diagram illustrating example details of an embodiment of the communication system.

Turning to FIG. 5, FIG. 5 is a simplified block diagram illustrating example details of an embodiment of the communication system 10. A representative one of service nodes 24(1)-24(m) is denoted as service node 24 in the FIGURE; likewise, a representative one of taggers 26(1)-26(m) is denoted as tagger 26 in the FIGURE. Tagger 26 may include a processor 102, a memory element 104, a tag module 106, and a tag stripper 108. Tag-port module 32 may include a processor 110, a memory element 112, and a tag-to-node mapper 114 that includes a tag-to-node map 115. Tag-flow module 36 may include a processor 116, a memory element 118, a tag-to-flow mapper 120 that includes a tag-to-flow map 121, a tag stripper 122, and a tag module 123.

Client 12 may send a first packet 124, destined to server 18. First packet 124 may be intercepted by tagger 26 when first packet 124 arrives at service node 24. Tag module 106 may generate tag 30 and tag first packet 124 with tag 30 to create tagged first packet 126. Tagged first packet 126 may be received by tag-port module 32. Tag-to-node mapper 114 may map tag 30 to corresponding service node 24 in tag-to-node map 115. Tag-to-node map 115 may be any suitable data structure, table, or other suitable object in software or hardware that can be read from and written to by tag-port module 32. Each tag 30 may have a unique port associated with it, indicating the port corresponding to service node 24. For example, service node 24 may be identified by a member ID N1. N1 may be associated with port 353 in switch 20 according to tag-to-node map 115 (e.g., N1→port 353). Any packet received by tag-port module 32 that has tag 30 indicating N1 may be forwarded to port 353, corresponding to service node 24.

Tagged first packet 126 may be forwarded on to server 18, and intercepted by tag-flow module 36 before forwarding to appropriate application 16. Tag-to-flow mapper 120 may inspect tag 30 (and other information) in tagged first packet 126, and map tag 30 to the connection pertaining to the flow in tag-to-flow map 121. For example, tag-to-flow mapper 120 may inspect the packet header in tagged first packet 126 and determine that it belongs to a connection identified by the tuple <source IP address=client IP address; destination IP address=server IP address; source port=client port; and destination port=server port>. Tag-to-flow mapper 120 may associate tag 30, which includes the member id (e.g., N1) of service node 24 with the flow's 5-tuple information (e.g., <flow's 5-tuple>→N1) in tag-to-flow map 121. In various embodiments, tag-to-flow map 121 may be any suitable data structure, table, or other suitable object in software or hardware that can be read from and written to by tag-flow module 36. Tag-stripper 122 may strip tag 30 from tagged first packet 126, and forward untagged first packet 124 to application 16.

Application 16, having received a regular (e.g., untagged) IP packet in first packet 124, may process it appropriately. For example, application 16 may fetch data requested in first packet 124. Application 16 may prepare a second packet 130 (e.g., in response to first packet 124) and send it to client 12. Tag-flow module 36 may intercept second packet 130. Tag-to-flow mapper 120 may inspect second packet 130 and determine (e.g., from the packet header) that second packet 130 belongs to the same connection as first packet 124. Tag module 123 may tag second packet 130 with tag 30, obtained from tag-to-flow map 121, to generate tagged second packet 132. Tagged second packet 132 may be forwarded on to client 12.

Tag-port module 32 may receive tagged second packet 132, and tag-to-node mapper 114 may inspect tag 30. From the previously stored tag-to-node map 115, tag-to-node mapper 114 may determine that service node 24 should receive tagged second packet 132. For example, tag-to-node map 115 may indicate that port 353 is associated with N1 indicated in tag 30. Tagger 26 in service node 24 may receive tagged second packet 132, and tag stripper 108 may strip tag 30 therefrom. Untagged second packet 130 may be subsequently forwarded to client 12 appropriately.

Figure 6:
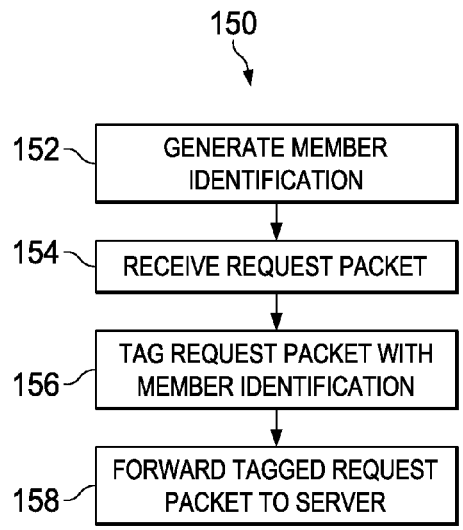
FIG. 6 is a simplified flow diagram illustrating yet other example activities that may be associated with embodiments of the communication system.

Turning to FIG. 6, FIG. 6 is a simplified flow diagram illustrating yet other example activities that may be associated with embodiments of communication system 10. Operations 150 may include 152, at which tag 30 may be generated by tagger 26. In some embodiments, tag 30 may be generated by generating a member id corresponding to the appropriate service node (e.g., service node 24(1)), and inserting the member id in tag 30. At 154, request packet 14 may be received from switch 20. At 156, request packet 14 may be tagged with tag 30. At 158, tagged request packet 28 may be forwarded to server 18 via switch 20.

Figure 7:
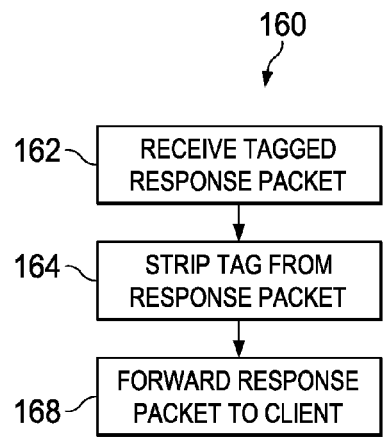
FIG. 7 is a simplified flow diagram illustrating yet other example activities that may be associated with embodiments of the communication system.

Turning to FIG. 7, FIG. 7 is a simplified flow diagram illustrating yet other example activities that may be associated with embodiments of communication system 10. Operations 160 may include 152, at which tagger 26 may receive tagged response packet 39, including tag 30, from switch 20. At 164, tagger 26 may strip tag 30 from tagged response packet 39. At 168, service node 24(1) may forward response packet 38 (untagged) to client 12.

Figure 8:
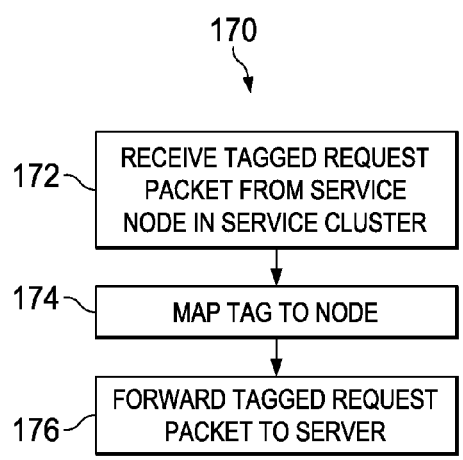
FIG. 8 is a simplified flow diagram illustrating yet other example activities that may be associated with embodiments of the communication system.

Turning to FIG. 8, FIG. 8 is a simplified flow diagram illustrating yet other example activities that may be associated with embodiments of communication system 10. Operations 170 may include 172, at which tag-port module 32 receives tagged request packet 28 from service node 24(1) in service cluster 22. At 174, tag-port module 32 may map tag 30 in tagged request packet 28 to service node 24(1). The mapping may be entered into tag-to-node map 115. In some embodiments, tag 30 may be mapped to a port corresponding to service node 24(1). At 176, switch 20 may forward tagged request packet 28 to server 18.

Figure 9:
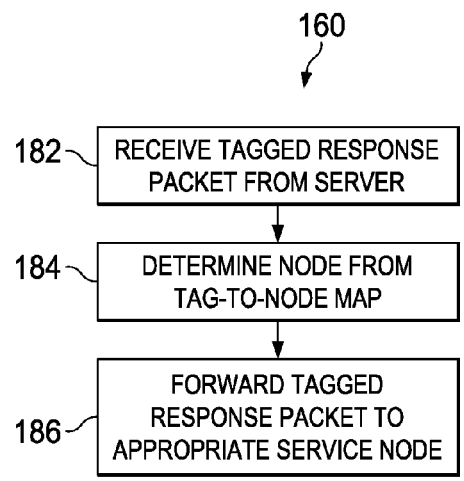
FIG. 9 is a simplified flow diagram illustrating yet other example activities that may be associated with embodiments of the communication system.

Turning to FIG. 9, FIG. 9 is a simplified flow diagram illustrating yet other example activities that may be associated with embodiments of communication system 10. Operations 180 may include 182, at which tag-port module 32 may receive tagged response packet 39 from server 18. At 184, tag-port module 32 may determine the service node (e.g., service node 24(1)) to forward tagged response packet 39 from tag-to-node map 115. In some embodiments, tag-port module 32 may identify the appropriate port corresponding to service node 24(1) and forward tagged response packet 39 through the identified port. At 186, switch 20 may forward tagged response packet 39 to the appropriate service node (e.g., service node 24(1)).

Figure 10:
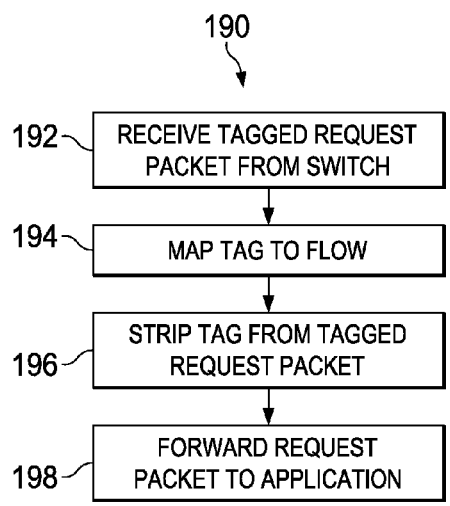
FIG. 10 is a simplified flow diagram illustrating yet other example activities that may be associated with embodiments of the communication system.

Turning to FIG. 10, FIG. 10 is a simplified flow diagram illustrating yet other example activities that may be associated with embodiments of communication system 10. Operations 190 may include 192, at which tag-flow module 36 receives tagged request packet 28 from switch 20. At 194, tag-flow module 36 may map tag 30 to the flow pertaining to the connection between client 12 and server 18 in tag-to-flow map 121. At 196, tag-flow module 36 may strip tag 30 from tagged request packet 28. At 198, tag-flow module 36 may forward request packet 14 (untagged) to application 16.

Figure 11:
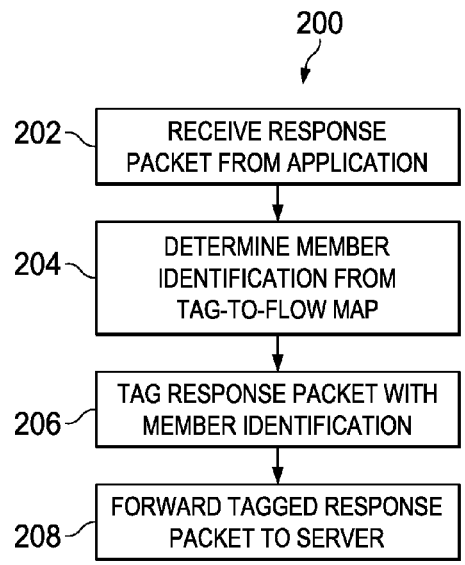
FIG. 11 is a simplified flow diagram illustrating yet other example activities that may be associated with embodiments of the communication system.

Turning to FIG. 11, FIG. 11 is a simplified flow diagram illustrating yet other example activities that may be associated with embodiments of communication system 10. Operations 200 may include 202, at which tag-flow module 36 may receive response packet 38 from application 16. At 204, tag-flow module 36 may determine, from the previously stored tag-to-flow map 121, that tag 30 matches with the flow pertaining to the connection between server 18 and client 12 as specified in response packet 38. At 206, tag-flow module 36 may tag response packet 38 with tag 30. At 208, vSwitch 34 may forward tagged response packet 39 to server 18.

Figure 12:
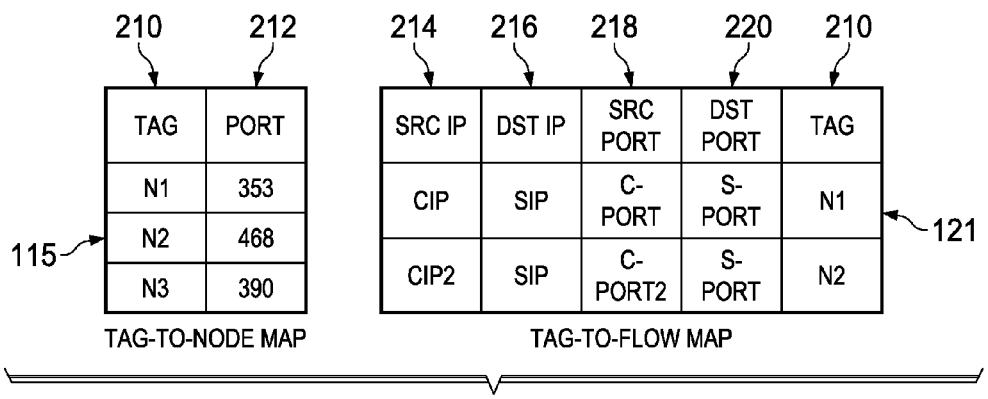
FIG. 12 is a simplified diagram illustrating example details of an embodiment of the communication system.

Turning to FIG. 12, FIG. 12 is a simplified diagram illustrating example tag-to-node and tag-to-flow maps. Example tag-to-node map 115 may include a tag field 210 and a port field 212. Tag field 210 may specify the member id of corresponding service nodes 24(1)-24(m). For example, member id N1 (corresponding to service node 24(1)) may be associated with port 353; member id N2 (corresponding to service node 24(2)) may be associated with port 468; member id N3 (corresponding to service node 24(3)) may be associated with port 390.

In some embodiments, the association between the member id and the corresponding port may be made as and when packets are received at switch 20 from service cluster 22. For example, a packet received from service node 24(1) via port 353 and including member id N1 may result in populating tag-to-node map 115 accordingly. In other embodiments, tag-to-node map 115 may be populated during device configuration. For example, switch 20 may assign specific port numbers to respective service nodes 24(1)-24(m); each of service nodes 24(1)-24(m) may generate respective member ids and communicate the member ids to switch 20. Subsequently switch 20 may populate tag-to-node map 115 appropriately.

Note that the member ids and port numbers provided herein are merely for illustrative purposes, and are not intended to be limitations to the embodiments. Virtually any port number or member id may be used herein within the broad scope of the embodiments. Tag-to-node map 115 may be stored appropriately in any storage device, memory element, etc. based on particular configuration choices.

Example tag-to-flow map 121 may include tag field 210, in addition to a source IP address (SRC IP) field 214, a destination IP address (DST IP) field 216, a source port (SRC PORT) field 218, and a destination port (DST PORT) field 220. Any other appropriate field (e.g., protocol field) may also be added based on particular configuration choices. For example, a packet (e.g., request packet 14) received by tag-flow module 36, may belong to a connection characterized by source IP address CIP, destination IP address SIP, source port C-port, and destination port S-port. Tag 30 of request packet 14 may specify N1 as the member id. Correspondingly, tag-to-flow mapper 120 may insert N1 in tag field 210 and the flow parameters in the corresponding fields of tag-to-flow map 121. When a packet having the flow parameters specified in tag-to-flow map 121 is received, the corresponding member id from tag field 210 may be determined from tag-to-flow map 121. When a packet is received that does not have the flow parameters in tag-to-flow map 121, a new entry may be populated accordingly.

Note that the member ids and flow parameters provided herein are merely for illustrative purposes, and are not intended to be limitations to the embodiments. Virtually any flow parameter or member id may be used herein within the broad scope of the embodiments. Tag-to-flow map 121 may be stored appropriately in any storage device, memory element, etc. based on particular configuration choices.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

In example implementations, at least some portions of the activities outlined herein may be implemented in software in, for example, tagger 26, tag-port module 32, and/or tag-flow module 36. In some embodiments, one or more of these features may be implemented in hardware, provided external to these elements, or consolidated in any appropriate manner to achieve the intended functionality. The various network elements may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, tagger 26, tag-port module 32, and/or tag-flow module 36 described and shown herein (and/or its associated structures) may also include suitable interfaces for receiving, transmitting, and/or otherwise communicating data or information in a network environment. Additionally, some of the processors and memory elements associated with the various service nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory elements 104, 112, 118) can store data used for the operations described herein. This includes the memory element being able to store instructions (e.g., software, logic, code, etc.) in non-transitory media such that the instructions are executed to carry out the activities described in this Specification. A processor can execute any type of instructions associated with the data to achieve the operations detailed herein in this Specification. In one example, processors (e.g., processors 102, 110, 116) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, components in communication system 10 can include one or more memory elements (e.g., memory elements 104, 112, 118) for storing information to be used in achieving operations as outlined herein. These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
    receiving at a switch, from a service node in a service cluster, a first packet of a connection between a client and a server, wherein the switch and the service cluster are located between the client and the server in the connection, wherein the first packet is tagged with a tag comprising a member ID that identifies the service node, wherein the service cluster includes a plurality of service nodes having distinct member IDs and providing identical services to packets;
    mapping the member ID to the service node in a tag-to-node map;
    receiving a second packet of the connection, wherein the second packet is tagged with the tag comprising the member ID;
    determining the service node from the tag-to-node map; and
    forwarding the second packet to the service node.

2. The method of claim 1, further comprising:
    receiving at the switch, from the client, the first packet prior to being tagged;
    choosing the service node according to an Equal Cost Multi-Path (ECMP) routing algorithm; and
    forwarding the first packet prior to being tagged to the service node.

3. The method of claim 1, wherein the service node generates the member ID, inserts the member ID into the tag, and tags the first packet with the member ID.

4. The method of claim 3, wherein the service node receives the second packet tagged with the member ID, and strips the tag from the second packet.

5. The method of claim 1, wherein a virtual switch at the server receives the first packet tagged with the tag comprising the member ID, maps the tag to the connection in a tag-to-flow map, and strips the tag from the first packet.

6. The method of claim 5, wherein the virtual switch receives the second packet prior to being tagged, determines the member ID from the tag-to-flow map, and tags the second packet prior to being tagged with the member ID.

7. The method of claim 5, wherein the connection is identified by parameters including a source address and a destination address.

8. The method of claim 5, wherein the first packet is forwarded to an application hosted on the server, and the second packet is received from the application.

9. The method of claim 5, wherein a flow table is maintained across the switch, plurality of service nodes and one or more servers, and wherein the flow table comprises at least the tag-to-node map and the tag-to-flow map.

10. The method of claim 1, further comprising: incrementally adding one or more service nodes to the service cluster.

11. A non-transitory medium encoding logic that includes instructions for execution and when executed by a processor, is configured to perform operations comprising:
    receiving at a switch, from a service node in a service cluster, a first packet of a connection between a client and a server, wherein the switch and the service cluster are located between the client and the server in the connection, wherein the first packet is tagged with a tag comprising a member ID that identifies the service node, wherein the service cluster includes a plurality of service nodes having distinct member IDs and providing identical services to packets;
    mapping the member ID to the service node in a tag-to-node map;
    receiving a second packet of the connection, wherein the second packet is tagged with the tag comprising the member ID;
    determining the service node from the tag-to-node map; and
    forwarding the second packet to the service node.

12. The non-transitory medium of claim 11, wherein the service node generates the member ID, inserts the member ID into the tag and tags the first packet.

13. The non-transitory medium of claim 12, wherein the service node receives the second packet tagged with the member ID, and strips the tag from the second packet.

14. The non-transitory medium of claim 11, wherein a virtual switch at the server receives the first packet tagged with the tag comprising the member ID, maps the tag to the connection in a tag-to-flow map, and strips the tag from the first packet.

15. The non-transitory medium of claim 14, wherein the virtual switch receives the second packet prior to being tagged, determines the member ID from the tag-to-flow map, and tags the second packet prior to being tagged with the member ID.

16. An apparatus, comprising:
a memory element for storing data; and
a processor that executes instructions associated with the data, wherein the processor and the memory element cooperate such that the apparatus is configured for:
receiving, from a service node in a service cluster, a first packet of a connection between a client and a server, wherein the apparatus and the service cluster are located between the client and the server in the connection, wherein the first packet is tagged with a tag comprising a member ID that identifies the service node, wherein the service cluster includes a plurality of nodes having distinct member IDs and providing identical services to packets;
mapping the member ID to the service node in a tag-to-node map;
receiving a second packet of the connection, wherein the second packet is tagged with the tag comprising the member ID;
determining the service node from the tag-to-node map; and
forwarding the second packet to the service node.

17. The apparatus of claim 16, wherein the service node generates the member ID, inserts the member ID into the tag, and tags the first packet.

18. The apparatus of claim 17, wherein the service node receives the second packet tagged with the member ID, and strips the tag from the second packet.

19. The apparatus of claim 16, wherein a virtual switch at the server receives the first packet tagged with the tag comprising the member ID, maps the tag to the connection in a tag-to-flow map, and strips the tag from the first packet.

20. The apparatus of claim 19, wherein the virtual switch receives the second packet prior to being tagged, determines the member ID from the tag-to-flow map, and tags the second packet prior to being tagged with the member ID.

* * * * *